US008880322B2

(12) United States Patent
Kato et al.

(10) Patent No.: US 8,880,322 B2
(45) Date of Patent: Nov. 4, 2014

(54) VEHICLE, ABNORMALITY DETERMINATION METHOD FOR INTERNAL COMBUSTION ENGINE, AND ABNORMALITY DETERMINATION DEVICE FOR INTERNAL COMBUSTION ENGINE

(75) Inventors: Toshikazu Kato, Toyota (JP); Yusuke Fujitsu, Anjo (JP)

(73) Assignees: Toyota Jidosha Kabushiki Kaisha, Toyota-Shi (JP); Denso Corporation, Kariya (JP)

( * ) Notice: Subject to any disclaimer, the term of this patent is extended or adjusted under 35 U.S.C. 154(b) by 528 days.

(21) Appl. No.: 13/306,309

(22) Filed: Nov. 29, 2011

(65) Prior Publication Data
US 2012/0136552 A1   May 31, 2012

(30) Foreign Application Priority Data

Nov. 30, 2010   (JP) .................................. 2010-266742

(51) Int. Cl.
*G06F 19/00* (2011.01)
*F02D 41/22* (2006.01)

(52) U.S. Cl.
CPC ................. *F02D 41/22* (2013.01); *Y02T 10/40* (2013.01); *F02D 2200/101* (2013.01); *F02D 2200/703* (2013.01); *F02D 2200/1002* (2013.01)
USPC .................... 701/114; 123/479; 73/114.45

(58) Field of Classification Search
CPC .............................. F02D 41/222; F02M 65/00
USPC .......... 123/445, 479; 701/103–105, 114, 115; 73/114.45
See application file for complete search history.

(56) References Cited

U.S. PATENT DOCUMENTS

| 5,113,834 A * | 5/1992 | Aramaki ........................ 123/520 |
| 6,109,244 A * | 8/2000 | Yamamoto et al. ............ 123/478 |
| 6,807,851 B2 * | 10/2004 | Wakahara et al. .......... 73/114.39 |
| 2002/0060496 A1 * | 5/2002 | Mizutani et al. ........... 303/114.3 |
| 2003/0019286 A1 * | 1/2003 | Wakahara et al. ............ 73/118.1 |
| 2003/0070423 A1 * | 4/2003 | Morinaga et al. ................ 60/284 |

FOREIGN PATENT DOCUMENTS

| JP | 62048939 A | 3/1987 |
| JP | 09-088643 A | 3/1997 |
| JP | 09-096243 A | 4/1997 |

* cited by examiner

*Primary Examiner* — John Kwon
(74) *Attorney, Agent, or Firm* — Kenyon & Kenyon LLP

(57) ABSTRACT

A vehicle including an internal combustion engine provided with a plurality of cylinders, and a control unit that determines that an abnormality of the internal combustion engine has occurred when an atmospheric pressure has a first value and an operation state represented by at least one of an output shaft revolution speed and a load of the internal combustion engine is within a preset region and determines that an abnormality of the internal combustion engine has occurred when the atmospheric pressure has a second value that is lower than the first value and the operation state is outside the region.

13 Claims, 7 Drawing Sheets

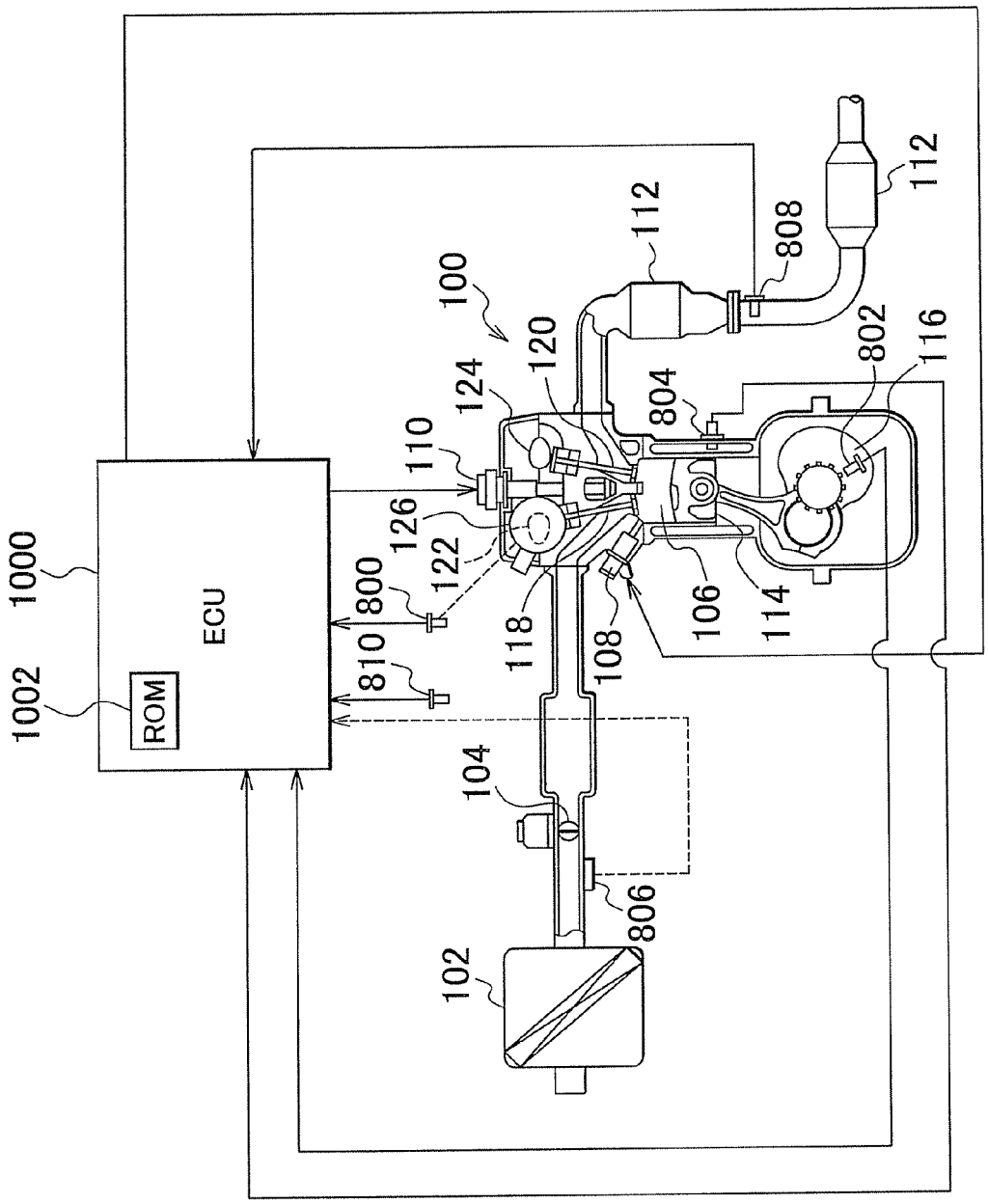
F I G . 2

VEHICLE, ABNORMALITY DETERMINATION METHOD FOR INTERNAL COMBUSTION ENGINE, AND ABNORMALITY DETERMINATION DEVICE FOR INTERNAL COMBUSTION ENGINE

INCORPORATION BY REFERENCE

The disclosure of Japanese Patent Application No. 2010-266742 filed on Nov. 30, 2010 including the specification, drawings and abstract is incorporated herein by reference in its entirety.

BACKGROUND OF THE INVENTION

1. Field of the Invention

The invention relates to a vehicle, an abnormality determination method for an internal combustion engine, and an abnormality determination device for an internal combustion engine, and more particularly to a technique for changing an operation region that determines an abnormality according to the atmospheric pressure.

2. Description of Related Art

An internal combustion engine is available in which fuel is burned in cylinders. In the internal combustion engine, the fuel is not necessarily always burned normally. For this reason, a variety of abnormality determination functions are incorporated in a control device that controls the internal combustion engine.

Japanese Patent Application Publication No. 9-96243 (JP-A-9-96243) discloses a misfire detection device for an internal combustion engine that determines a misfire detection region by the engine load state and detects a misfire state within the misfire detection region.

Where a wide detection region is set, an abnormality can be determined in the operation state in which an abnormality can be easily detected erroneously. For this reason, the abnormality detection accuracy can degrade. Therefore, it is desirable that the detection region be restricted. However, when the detection region is restricted, the frequency of the internal combustion engine being operated in an operation state outside the detection region may increase. For example, where an internal combustion engine is operated under a higher revolution speed and a lower load as the atmospheric pressure decreases with the object of ensuring a negative pressure inside the intake pipe, the internal combustion engine can operate in an operation state outside the detection region restricted so as to include the operation state (load and revolution speed of output shaft) corresponding to the normal atmospheric pressure. In a case like that, abnormality detection may not be accomplished even if there is engine abnormally.

SUMMARY OF THE INVENTION

The invention provides a vehicle, an abnormality determination method for an internal combustion engine, and an abnormality determination device for an internal combustion engine that allow an opportunity to detect an abnormality.

The first aspect of the invention resides in a vehicle including: an internal combustion engine provided with a plurality of cylinders; and a control unit that determines an abnormality of the internal combustion engine. The control unit determines that an abnormality of the internal combustion engine has occurred when an atmospheric pressure has a first value and an operation state represented by at least one of an output shaft revolution speed and a load of the internal combustion engine is within a preset region. The control unit also determines that an abnormality of the internal combustion engine has occurred when the atmospheric pressure has a second value that is lower than the first value and the operation state is outside the region.

The second aspect of the invention resides in an abnormality determination method for an internal combustion engine provided with a plurality of cylinders. The method includes determining that an abnormality of the internal combustion engine has occurred when an atmospheric pressure has a first value and an operation state represented by at least one of an output shaft revolution speed and a load of the internal combustion engine is within a preset region. An abnormality of the internal combustion engine is also determined to have occurred when the atmospheric pressure has a second value that is lower than the first value and the operation state is outside the region.

The third aspect of the invention resides in an abnormality determination device for an internal combustion engine provided with a plurality of cylinders. The device includes a first determination unit for determining that an abnormality of the internal combustion engine has occurred when an atmospheric pressure has a first value and an operation state represented by at least one of an output shaft revolution speed and a load of the internal combustion engine is within a preset region, and a second determination unit for determining that an abnormality of the internal combustion engine has occurred when the atmospheric pressure has a second value that is lower than the first value and the operation state is outside the region.

With the above-described configuration, an abnormality of the internal combustion engine is determined to have occurred in the operation state within the preset region when the atmospheric pressure has the first value. An abnormality of the internal combustion engine is also determined to have occurred in the operation state outside the preset region when the atmospheric pressure has the second value that is lower than the first value. As a result, where the atmospheric pressure has the second value, an abnormality of the internal combustion engine is determined to have occurred in the operation state outside the region. Therefore, the accuracy of abnormality determination can be ensured.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a schematic configuration diagram of an engine;

DETAILED DESCRIPTION OF EMBODIMENTS

Figure 1:
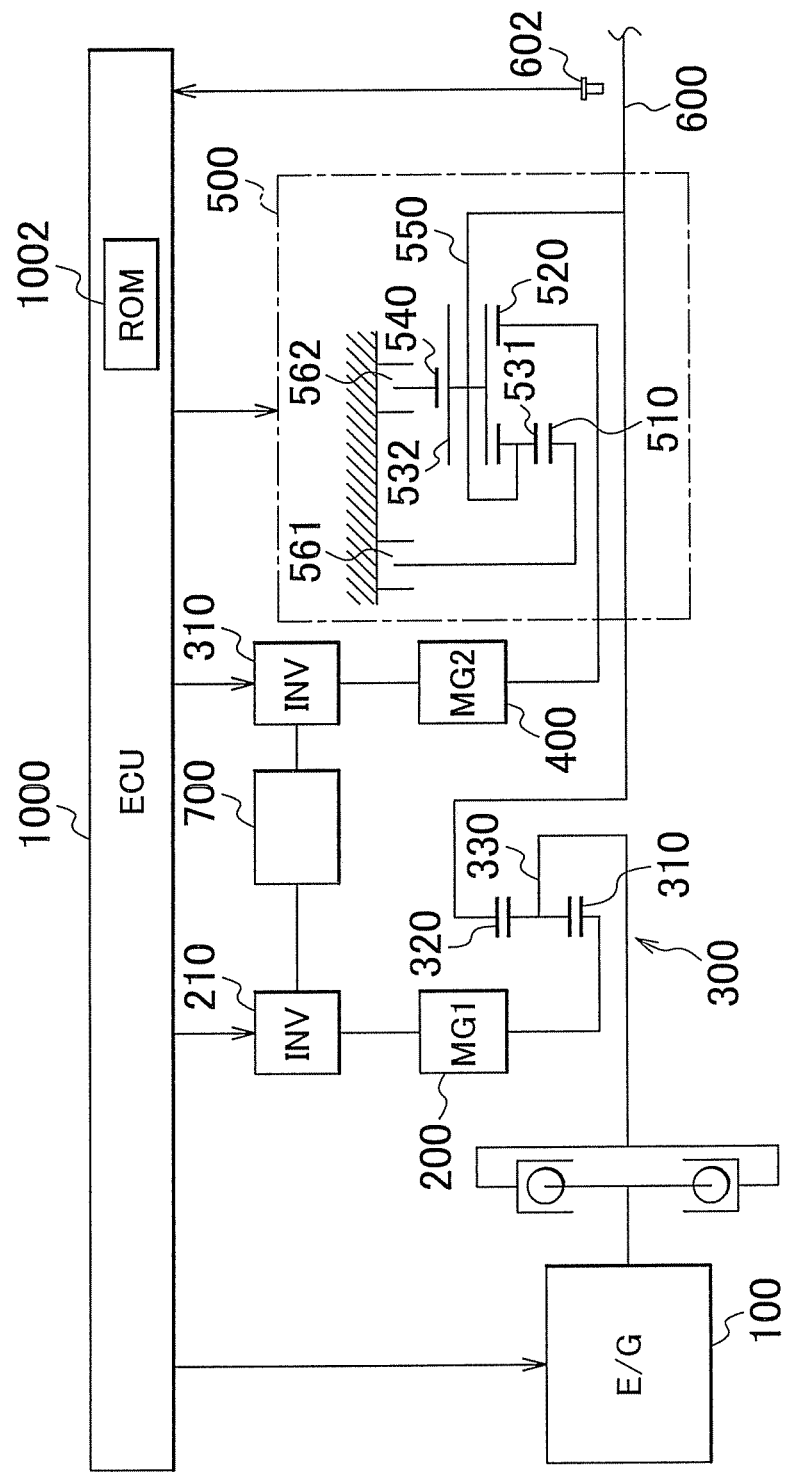
FIG. 1 is a schematic configuration diagram illustrating a power train of a hybrid vehicle.

An embodiment of the invention will be described below with reference to the appended drawings. In the explanation below, like components are assigned with like reference numerals. These components have same names and functions. Therefore, detailed explanation thereof is not repeated.

A power train of a hybrid vehicle will be explained below with reference to FIG. 1. As shown in FIG. 1, the power train is constituted mainly by an engine 100, a first motor generator (MG1) 200, a power distribution mechanism 300 that combines or distributes the torque between the engine 100 and the first motor generator 200, a second motor generator (MG2) 400, and a transmission 500.

The engine 100 is a conventional power apparatus that outputs power generated by combustion of fuel. The engine is configured such that the operation state such as a throttle opening degree (air intake amount), a fuel supply amount, and an ignition timing can be electrically controlled. This control is performed, for example, by an ECU 1000 based on a microcomputer.

As shown in FIG. 2, the air is sucked in from an air cleaner 102 into the engine 100. The intake air amount is adjusted by a throttle valve 104. The throttle valve 104 is an electronic throttle valve driven by a motor.

The air is mixed with fuel in a cylinder 106 (combustion chamber). A plurality of cylinders 106 is provided. The fuel is directly injected form an injector 108 into the cylinder 106. Thus, an injection hole of the injector 108 is provided inside the cylinder 106. The fuel is injected from the intake side (side where the air is introduced) of the cylinder 106.

The air is injected in an intake stroke. The injection timing of the fuel is not limited to the intake stroke. Further, in the embodiment, the engine 100 is explained as a direct injection engine in which the injection hole of the injector 108 is provided inside the cylinder 106, but an injector for port injection may be also provided in addition to the injector 108 for direct injection. Furthermore, only the injector for port injection may be provided.

The mixture located inside the cylinder 106 is ignited by a sparkplug 110 and burned. The mixture after combustion, that is, the exhaust gas is purified by a three-way catalyst 112 and released to the outside of the vehicle. The combustion of the mixture pushes a piston 114 down and a crankshaft 116 is rotated.

An intake valve 118 and an exhaust valve 120 are provided in the head portion of the cylinder 106. The amount of air introduced into the cylinder 106 and the introduction timing are controlled by the intake valve 118. The amount of exhaust gas discharged from the cylinder 106 and the discharge timing are controlled by the exhaust valve 120. The intake valve 118 is driven by a cam 122. The exhaust valve 120 is driven by a cam 124.

The opening-closing timing (phase) of the intake valve 118 is changed by a variable valve timing (VVT) mechanism 126. The opening-closing timing of the exhaust valve 120 may be also changed.

In the embodiment, the opening-closing timing of the intake valve 118 is controlled by rotating a camshaft (not shown in the figure) provided with a cam 122 by the VVT mechanism 126. A method for controlling the opening-closing timing is not limited. In the embodiment, the VVT mechanism 126 is actuated by hydraulic pressure.

The engine 100 is controlled by the ECU 1000. The ECU 1000 controls the throttle opening degree, ignition timing, fuel injection timing, fuel injection amount, and opening-closing timing of the intake valve 118 so as to obtain the desired operation state of the engine 100. Signals from a cam angle, sensor 800, a crank angle sensor 802, a water temperature sensor 804, an air flow meter 806, an air-fuel ratio sensor 808, and an atmospheric pressure sensor 810 are inputted to the ECU 1000.

The cam angle sensor 800 outputs a signal representing the position of the cam. The crank angle sensor 802 outputs a signal representing the revolution speed (engine revolution speed) NE of the crankshaft 116 and the rotation angle of the crankshaft 116. The water temperature sensor 804 outputs a signal representing the temperature of cooling water (also referred to hereinbelow as water temperature) of the engine 100. The air flow meter 806 outputs a signal representing the amount of air sucked into the engine 100. The air-fuel ratio sensor 808 outputs a signal representing the air-fuel ratio of the exhaust gas. The atmospheric pressure sensor 810 outputs a signal representing the atmospheric pressure. Instead of determining the atmospheric pressure with the atmospheric pressure sensor 810, it is also possible to calculate the atmospheric pressure from the intake air temperature and intake air amount detected by using the air flow meter 806. Any conventional method for calculating the atmospheric pressure may be used, and the detailed explanation thereof is herein omitted.

The ECU 1000 controls the engine 100 on the basis of signals inputted from the aforementioned sensors and also the map and program stored in a read only memory (ROM) 1002.

In the embodiment, the ECU 1000 determines whether an abnormality residing in the difference in air-fuel ratio between the cylinders 106 has occurred on the basis of the signal inputted from the air-fuel ratio sensor 808. Thus, an abnormality is detected when the air-fuel ratio differs between the cylinders 106. The air-fuel ratio of each cylinder 106 is specified by the air-fuel ratio for each crank angle. The conventional technique can be used to detect the air-fuel ratio of each cylinder 106 and the detail explanation thereof is herein omitted. An abnormality other than the abnormality of air-fuel ratio may be also determined.

Returning to FIG. 1, the first motor generator 200 is for example, a three-phase AC rotary electric machine and is configured to function as an electric motor and as a generator. This electric machine is connected to a power storage device 700 such as a battery by means of an inverter 210. The output torque or regenerated torque of the first motor generator 200 is set as appropriate by controlling the inverter 210. This control is performed by the ECU 1000. A stator (not shown in the figure) of the first motor generator 200 is fixed and does not rotate.

The power distribution mechanism 300 is a conventional gear mechanism generating a differential action by using three rotating elements, namely, a sun gear (S) 310 that is an external gear, a ring gear (R) 320 that is an inner gear disposed concentrically with the sun gear (S) 310, and a carrier (C) 330 that serves to hold a pinion gear engaged with these sun gear (S) 310 and ring gear (R) 320 so that the pinion gear can rotate and revolve. The output shaft of the engine 100 is connected by means of a damper to the carrier (C) 330 which is the first rotating element. In other words, the carrier gear (C) 330 is an input element.

A rotor (not shown in the figure) of the first motor generator 200 is connected to the sun gear (S) 310 which is the second rotating element. Therefore, the sun gear (S) 310 is the so-called reaction element, and the ring gear (R) 320 which is the third rotating element is the output element. The ring gear (R) 320 is connected to an output shaft 600 connected to driven wheels (not shown in the figure). The revolution speed of the output shaft 600 is detected by an output shaft revolution speed sensor 602, and a signal representing the output shaft revolution speed is inputted to the ECU 1000.

Figure 3:
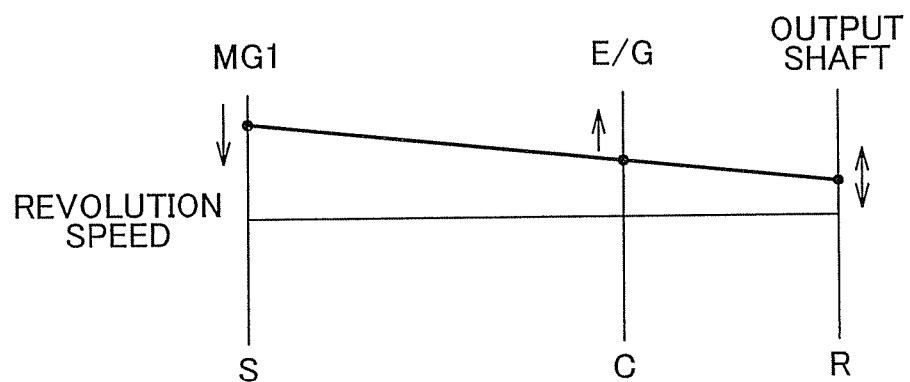
FIG. 3 is a collinear diagram of a power distribution mechanism.

FIG. 3 is a collinear diagram of the power distribution mechanism 300. As shown in FIG. 3, where the reaction torque produced by the first motor generator 200 is inputted to the sun gear (S) 310 with respect to the torque outputted by the engine 100 and inputted to the carrier (C) 330, the torque obtained by subtraction or addition of these torques appears on the ring gear (R) 320 which is the output element. In this case, the rotor of the first motor generator 200 is rotated by this torque, and the first motor generator 200 functions as a generator. Further, when the revolution speed (output revolution speed) of the ring gear (R) 320 is constant, the revolution speed of the engine 100 can be continuously (stepwise) changed by changing the revolution speed of the first motor generator 200. Thus, the control of setting the revolution speed of the engine 100, for example, to the revolution speed with the best fuel consumption can be performed by controlling the first motor generator 200. This control is performed by the ECU 1000.

Where the engine 100 is stopped when the vehicle runs, the first motor generator 200 rotates in reverse, and where the first motor generator 200 is caused to function as an electric motor from this state and the torque is outputted in the direct rotation direction, the torque in the direction causing direct rotation of the engine 100 connected to the carrier (C) 330 acts upon the engine, and the engine 100 can be started (monitoring or cranking) by the first motor generator 200. In this case, a torque in the direction stopping the rotation of the output shaft 600 acts thereupon. Therefore, the drive torque for maintaining the running state cam be maintained by controlling the torque outputted by the second motor generator 400. At the same time, the engine 100 can be smoothly started. The hybrid system of this kind is called a mechanical distribution system or a split type system.

Returning to FIG. 1, the second motor generator 400 is for example a three-phase AC rotating electric machine and configured to function as an electric motor and as a generator. This electric machine is connected to a power storage device 700 such as a battery by means of an inverter 310 and configured so that the power drive, regeneration, and torques in respective modes are controlled by controlling the inverter 310. The stator (not shown in the figure) of the second motor generation 400 is fixed and does not rotate.

The transmission 500 is constituted by a set of Labinyo-type planetary gear train. Each train is provided with a first sun gear (S1) 510 and a second sun gear (S2) 520, which are outer-teeth gears. A first pinion 531 is meshed with the first sun gear (S1) 510, the first pinion 531 is also meshed with a second pinion 532, and the second pinion 532 is meshed with a ring gear (R) 540 disposed concentrically with the sun gears 510, 520.

The pinions 531, 532 are held by the gear (C) 550 so that the pinions can rotate and revolve. The second sun gear (S2) 520 is meshed with the second pinion 532. Therefore, the first sun gear (S1) 510 and ring gear (R) 540 together with the pinions 531, 532 constitute a mechanism corresponding to a planetary gear mechanism of a double pinion type, and the second sun gear (S2) 520 and ring gear (R) 540 together with the second pinion 532 constitute a mechanism corresponding to a planetary gear mechanism of a single pinion type.

The transmission 500 is also provided with a B1 brake 561 that selectively fixes the first sun gear (S1) 510 and a B2 brake 562 that selectively fixes the ring gear (R) 540. These brakes 561, 562 are the so-called friction engagement elements that generate an engagement force by a friction force. A multi-plate engagement device or a band-type engagement device can be used. These brakes 561, 562 are configured so that the torque capacity thereof changes continuously in response to the engagement force created by hydraulic pressure. The above-described second motor generator 400 is connected to the second sun gear (S2) 520. The carrier (C) 550 is connected to the output shaft 600.

Therefore, in the abovementioned transmission 500, the second sun gear (S2) 520 is the so-called input element and the carrier (C) 550 is the output element. A high-speed stage with a speed ratio higher than "1" is set by engaging the B1 brake 561. A low-speed stage with a speed ratio higher than that of the high-speed stage is set by engaging the B2 brake 562 instead of the B1 brake 561.

Shifting between the speed stages is performed on the basis of a running state such as a vehicle speed and required drive power (or accelerator depression amount). More specifically, speed shift regions are determined in advance as a map (shifting diagram) and control is performed to set a speed stage corresponding to the detected operation state.

Figure 4:
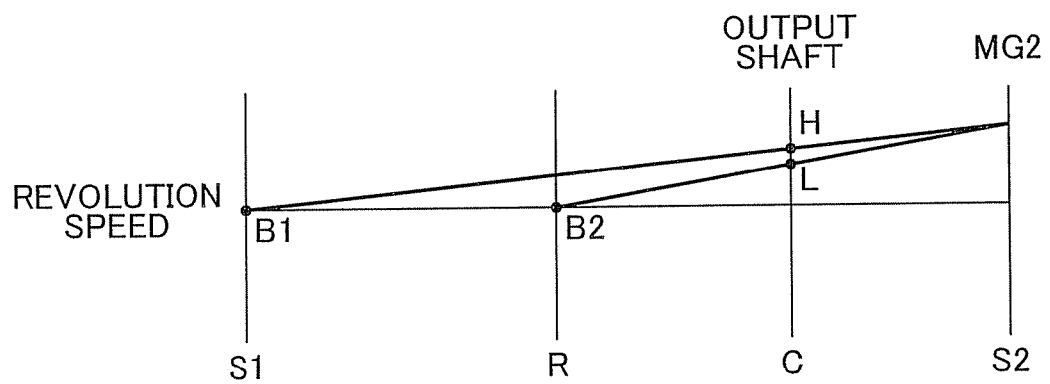
FIG. 4 is a collinear diagram of a transmission.

FIG. 4 shows a collinear diagram of the transmission 500. As shown in FIG. 4, where the ring gear (R) 540 is fixed by the B2 brake 562, a low speed stage L is set, and the torque outputted by the second motor generator 400 is increased in response to the speed ratio and applied to the output shaft 600. By contrast, where the first sun gear (S1) 510 is fixed by the B1 brake 561 a high-speed stage H with a speed ratio lower than that of the low-speed stage L is set. The speed ratio of the high-speed stage H is also higher than "1". Therefore, the torque outputted by the second motor generator 400 is increased according to this speed ratio and applied to the output shaft 600.

In a state in which the speed stages L, H are set permanently, the torque applied to the output shaft 600 becomes a torque obtained by increasing the output torque of the second motor generator 400 according to the speed ratio. However, in the shifting transition state, this torque is affected by the torque capacity of each brake 561, 562 or inertia torque that follows changes in the revolution speed. Further, in the drive state of the second motor generator 400, the torque applied to the output shaft 600 becomes a positive torque, and in the driven state the torque is negative.

Figure 5:
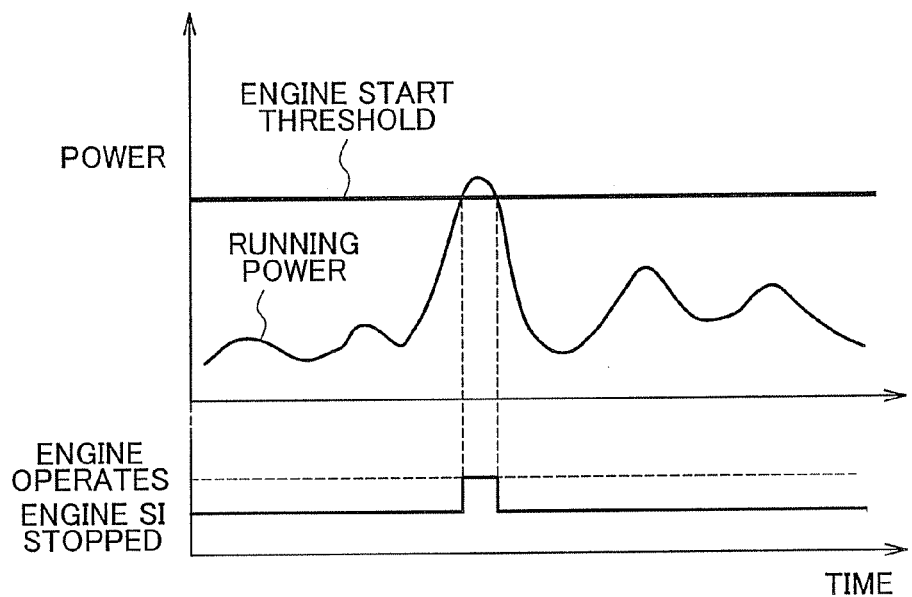
FIG. 5 illustrates an operation state of the engine.

As shown in FIG. 5, where the running power of a hybrid vehicle is less than an engine start threshold, the hybrid vehicle runs using only the drive power of the second motor generator 400.

By contrast, where the running power of the hybrid vehicle becomes equal to or higher than the engine start threshold value, the engine 100 is actuated. As a result, the hybrid vehicle runs using the drive power of the engine 100 in addition to or instead of the drive power of the second motor generator 400. Further, the electric power generated by the first motor generator 200 by using the drive power of the engine 100 is directly supplied to the second motor generator 400.

The running power is calculated by the ECU 1000 on the basis of a map having as parameters the vehicle speed and the depression amount of the accelerator pedal (acceleration pedal stroke) operated by the diver. Thus, in the embodiment, the running power of the hybrid vehicle represents the power requested by the driver. A method for calculating the running power is not limited. In the embodiment, the power units are kW (kilowatts).

The hybrid vehicle is controlled so that the generation of the running power is distributed among the engine 100 and the second motor generator 400. For example, in the case where the first motor generator 200 does not generate power, the sum of the output power of the engine 100 and the output power of the second motor generator 400 is substantially equal to the running power. Therefore, where the output power of the engine 100 is zero, the output power of the second motor generator 400 is controlled so as to be substantially equal to the running power. Where the output power of the second motor generator 400 is zero, the output power of the engine 100 is controlled so as to be substantially equal to the running power.

When the engine 100 is operated, the output torque of the second motor generator 400 is decreased and the ratio of the output power of the engine 100 in the running power is increased, for example, as the vehicle speed rises. For example, when the vehicle speed is higher than a threshold, the output torque of the second motor generator 400 is decreased to zero and the hybrid vehicle runs using only the drive power of the engine 100. However, this control mode of output power is not limiting.

Figure 6:
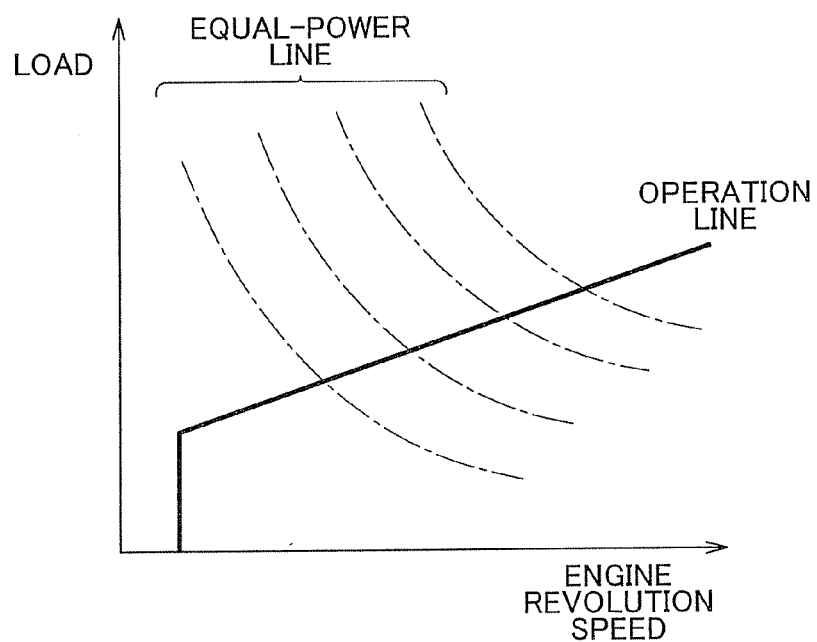
FIG. 6 shows operation lines defining the engine revolution speed and load.

The output shaft revolution speed (engine revolution speed) NE and load of the engine 100 are set according to the operation lines shown in FIG. 6. The operation line describes the relationship between the engine revolution speed NE and load. Thus, the operation line established operation points of the engine 100. The operation lines are determined in advance by a developer on the basis of test or simulation results.

The engine revolution speed NE and load of the engine 100 are determined as intersection points of the operation lines and equal-power lines indicating the output power of the engine 100 that has been established in response to the driver's operations. Thus, the engine revolution speed NE of the engine 100 is a revolution speed realizing the output power of the engine 100 established in response to the driver's operations on the operation line.

Figure 7:
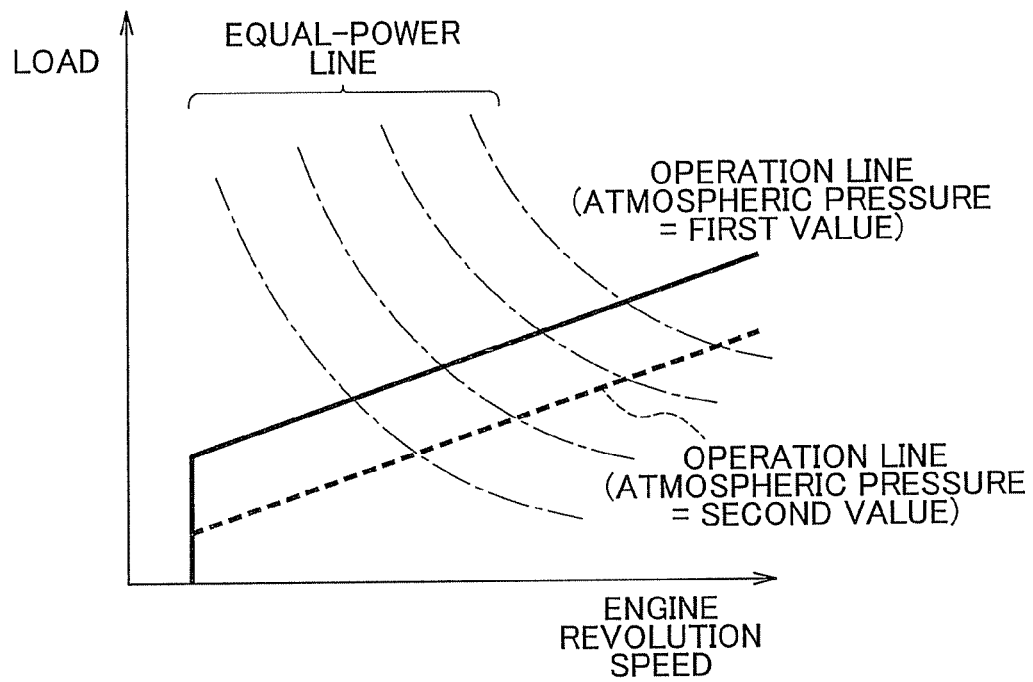
FIG. 7 shows operation lines obtained when the atmospheric pressure has the first value and operation lines obtained when the atmospheric pressure has the second value that is lower than the first value.

The operation line changes according to the atmospheric pressure. As shown in FIG. 7, where the output power of the engine 100 is the same, the operation line changes so that the engine revolution speed NE increases and the load decreases with the decrease in atmospheric pressure. In FIG. 7, the operation line obtained when the atmospheric pressure has the first value is shown by a solid line, and the operation line obtained when the atmospheric pressure has the second value which is lower than the first value is shown by a broken line. The operation line is changed to ensure a negative pressure in the intake path of the engine 100. The first value and second value are random values and are not limited to the specific values.

Figure 8:
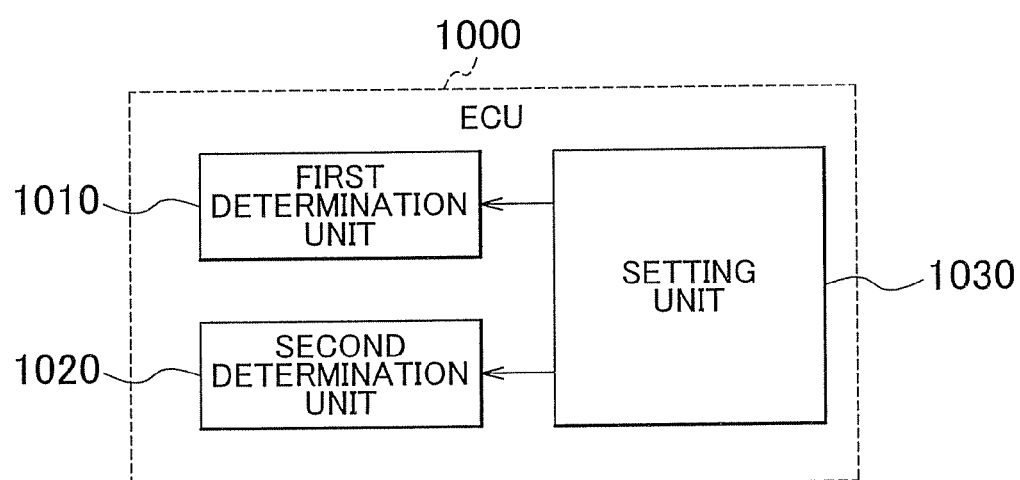
FIG. 8 is a functional block diagram illustrating functions of an electronic control unit (ECU)

Functions of the ECU 1000 will be explained below with reference to FIG. 8. The below-described functions may be realized, by software, hardware, or a combination thereof.

The ECU 1000 is provided with a first determination unit 1010, a second determination unit 1020, and a setting unit 1030. The first determination unit 1010 determines that an abnormality has occurred in the engine 100 when the atmospheric pressure has the first value and the engine revolution speed NE is equal to or lower than the upper limit value that has been set in advance. Therefore, the first determination unit 1010 detects an abnormality of the engine 100 when the atmospheric pressure has the first value, the engine revolution speed NE is equal to or lower than the upper limit value, and there is a difference in air-fuel ratio between the cylinders 106.

The first determination unit 1010 does not determine that an abnormality has occurred in the engine 100 when the atmospheric pressure is the first value and the engine revolution speed NE is higher than the upper limit value. Therefore, when the atmospheric pressure has the first value and the engine revolution speed NE is higher than the upper limit value, the first determination unit 1010 does not detect an abnormality in the engine 100 even when the air-fuel ratio differs between the cylinders 106. This is because an abnormality in air-fuel ratio can be erroneously determined in a state in which the engine revolution speed NE is high.

The first determination unit 1010 also determines that an abnormality has occurred in the engine 100 when the atmospheric pressure has the first value, and the load of the engine 100 is equal to or higher than the lower limit value that has been set in advance. Therefore, the first determination unit 1010 detects an abnormality in the engine 100 when the atmospheric pressure has the first value, the load is equal to or lower than the lower limit value, and the air-fuel ratio differs between the cylinders 106.

Further, the first determination unit 1010 does not determine that an abnormality has occurred in the engine 100 when the atmospheric pressure is the first value and the load is lower than the lower limit value. Therefore, when the atmospheric pressure has the first value and the load is lower than the limit value, the first determination unit 1010 does not detect an abnormality in the engine 100 even when the air-fuel ratio differs between the cylinders 106. This is because an abnormality in air-fuel ratio can be erroneously determined in a state in which the load is low.

Essentially, the first determination unit 1010 determines that an abnormality has occurred in the engine 100 when the atmospheric pressure has the first value and the operation state represented by at least one of the engine revolution speed NE and load is within the preset region. No abnormality is determined to have occurred in the engine 100 when the atmospheric pressure has the first value and the operation state is outside the preset state. The operation state may be represented only by one of the engine revolution speed NE and load. The second determination unit 1020 determines that an abnormality has occurred in the engine 100 when the atmospheric pressure has the second value which is lower than the first value and the engine revolution speed NE is higher than the upper limit value. Therefore, the second determination unit 1020 determines that an abnormality has occurred in the engine 100 when the atmospheric pressure has the second value, the engine revolution speed NE is higher than the upper limit value, and the air-fuel ratio differs between the cylinders 106.

Further, the second determination unit 1020 determines that an abnormality has occurred in the engine 100 when the atmospheric pressure has the second value which is lower than the first value and the load of the engine 100 is lower than the lower limit value. Therefore, the second determination unit 1020 determines that an abnormality has occurred in the engine 100 when the atmospheric pressure has the second value, the load is lower than the lower limit value, and the air-fuel ratio differs between the cylinders 106.

Essentially, the second determination unit 1020 determines that an abnormality has occurred in the engine 100 when the atmospheric pressure has the second value and the operation state represented by at least one of the engine revolution speed NE and load is outside the preset region. Functions of the first determination unit 1010 and the second determination unit 1020 are specifically realized by establishing the detection region according to the atmospheric pressure by the setting unit 1030 and determining that an abnormality has occurred in the engine 100 when the engine revolution speed NE and load are within the established detection region.

Figure 9:
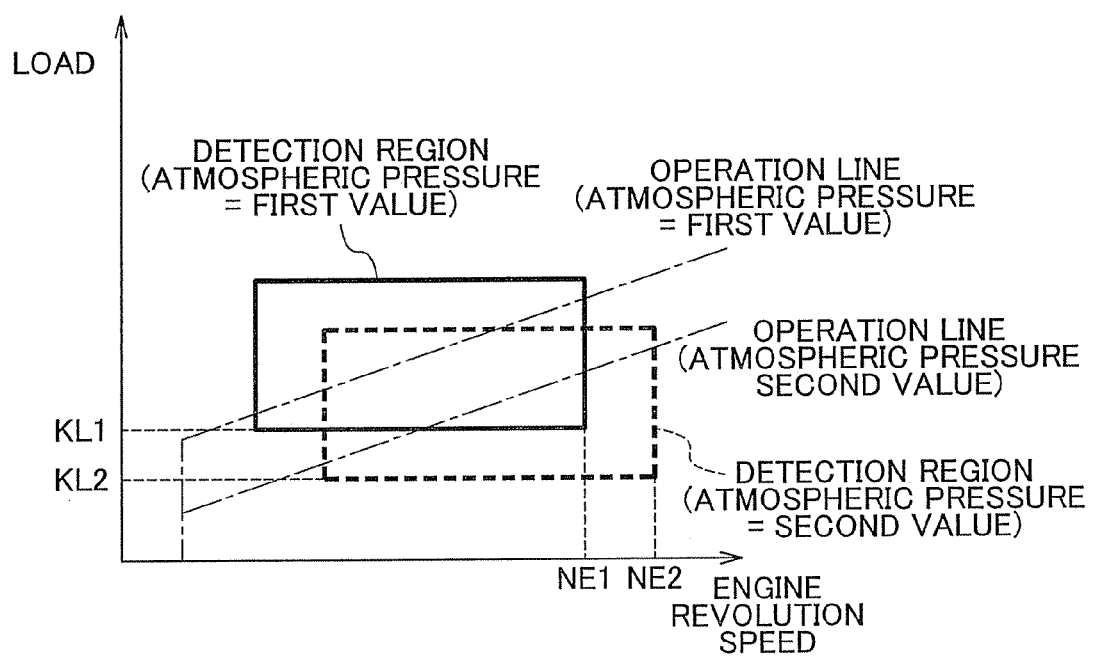
FIG. 9 shows a detection region obtained when the atmospheric pressure has the first value and a detection region obtained when the atmospheric pressure has the second value that is lower than the first value.

FIG. 9 shows an example of detection region. The detection region defines the engine revolution speed NE and load at which an abnormality is determined to have occurred in the engine 100. Therefore, when the engine revolution speed NE is within the detection region and the load of the engine 100 is within the detection region, the ECU 1000 determines that an abnormality has occurred in the engine 100.

In FIG. 9, the detection region (also referred to hereinbelow as the first detection region) that is set when the atmospheric pressure has the first value is shown by a solid line, and the detection region (also referred to hereinbelow as the second detection region) that is set when the atmospheric pressure has the second value is shown by a broken line. The operation line obtained when the atmospheric pressure has the first value is shown by a dot-dash line, and the operation line obtained when the atmospheric pressure has the second value is shown by a two-dot-dash line.

As is clearly shown in FIG. 9, when the atmospheric pressure has the first value, the first detection region is set so as to include the engine revolution speed NE and load defined by the operation line obtained when the atmospheric pressure has the first value. When the atmospheric pressure has the second value, the second detection region is set so as to include the engine revolution speed NE and load defined by the operation line obtained when the atmospheric pressure has the second value.

As a result, when the atmospheric pressure has the second value, the detection region is set to include the output shaft revolution speed higher than that in the case where the atmospheric pressure has the first value. The aforementioned "upper limit value" means a maximum value (output shaft revolution speed NE1) of output shaft revolution speed within the first detection region that is set in the case where the atmospheric pressure has the first value. Likewise, when the atmospheric pressure has the second value, the detection region is set to include a load lower than that in the case where the atmospheric pressure has the first value. The aforementioned "lower limit value" means a minimum value (load KL1) of load within the first detection region that is set in the case where the atmospheric pressure has the first value.

Because the detection region is set according to the atmospheric pressure, an abnormality is determined to have occurred in the engine 100 when the atmospheric pressure has the first value and the engine revolution speed NE and load are within the first detection region shown by the solid line in FIG. 9. Meanwhile, no abnormality is determined to have occurred in the engine 100 when the atmospheric pressure has the first value and the engine revolution speed NE or load is outside the first detection region shown by the solid line in FIG. 9. An abnormality is determined to have occurred in the engine 100 when the atmospheric pressure has the second value which is lower than the first value and the engine revolution speed NE or load is outside the first detection region shown by the solid line in FIG. 9.

Figure 10:
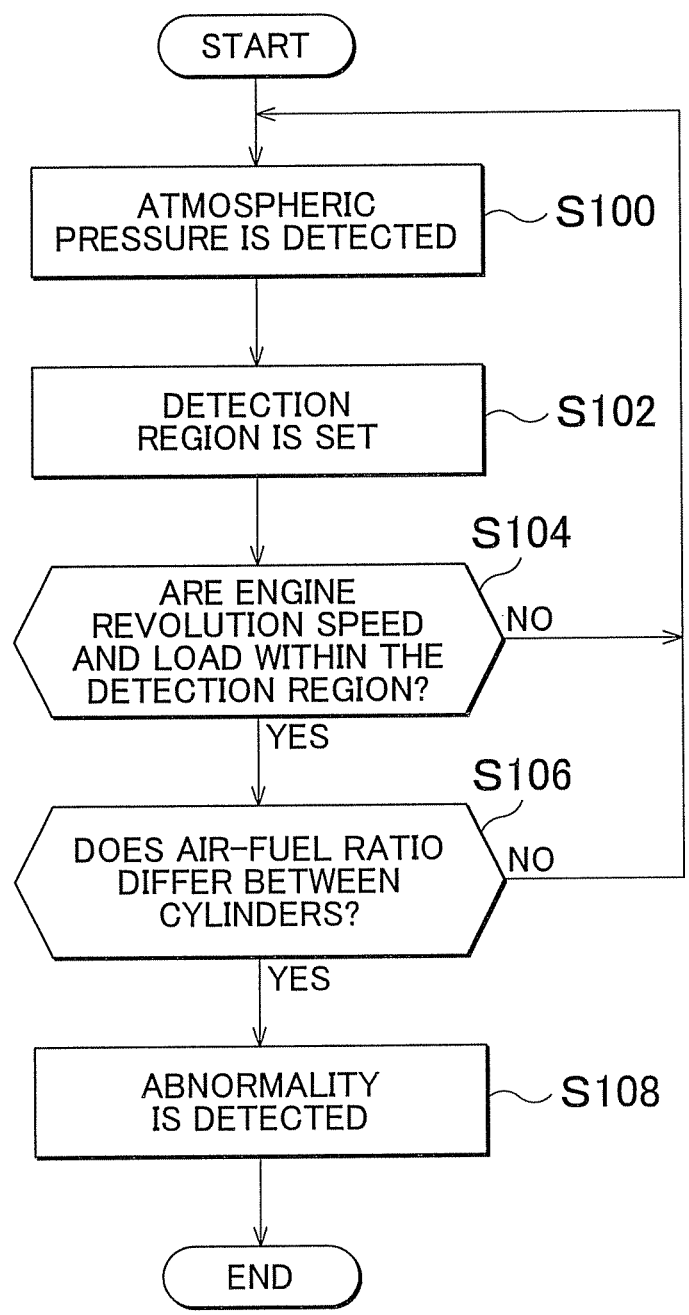
FIG. 10 is a flowchart illustrating the processing executed by the ECU.

The processing executed by the ECU 1000 will be explained below with reference to FIG. 10. In step (denoted hereinbelow by S) 100, the ECU 1000 detects the atmospheric pressure. In S102, the ECU 1000 sets the detection region according to the atmospheric pressure. In S104, the ECU 1000 determines whether or not the engine revolution speed NE and load are within the detection region.

Where the engine revolution speed NE and load are within the detection region (YES in S100), the processing advances to S106. In S106, the ECU 1000 determines whether or not the air-fuel ratio differs between the cylinders 106 on the basis of the air-fuel ratios detected by the air-fuel ratio sensor 808. Where the air-fuel ratio differs between the cylinders 106 (YES in S106), the processing advances to S108. In S108, the ECU 1000 detects an abnormality.

Where the engine revolution speed NE or load is outside the detection region (NO in S104), the ECU 1000 determines that no abnormality has occurred.

As described hereinabove, according to the embodiment, when the atmospheric pressure has the first value, an abnormality is determined to have occurred in the engine 100 in the operation state within the preset region. Meanwhile, when the atmospheric pressure has the second value which is lower than the first value, an abnormality of the engine 100 is determined to have occurred even in the operation state outside the preset region. As a result, the frequency of abnormality determination is ensured.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A vehicle comprising:
an internal combustion engine that is provided with a plurality of cylinders; and
a control unit that determines that an abnormality of the internal combustion engine has occurred when an atmospheric pressure has a first value and an operation state represented by at least one of an output shaft revolution speed and a load of the internal combustion engine is within a preset region, and determines that an abnormality of the internal combustion engine has occurred when the atmospheric pressure has a second value that is lower than the first value and operation state is outside the region.

2. The vehicle according to claim 1, wherein
the control unit does not determine that an abnormality of the internal combustion engine has occurred when the atmospheric pressure has the first value and the operation state is outside the region.

3. The vehicle according to claim 1, wherein
the control unit detects an abnormality of the internal combustion engine when the atmospheric pressure has the first value, the operation state is within the region, and an air-fuel ratio differs between the cylinders, and
the control unit detects an abnormality of the internal combustion engine when the atmospheric pressure has the second value, the operation state is outside the region, and the air-fuel ratio differs between the cylinders.

4. The vehicle according to claim 1, wherein
the operation state is represented by the output shaft revolution speed of the internal combustion engine;
the control unit determines that an abnormality of the internal combustion engine has occurred when the atmospheric pressure has the first value and the output shaft revolution speed of the internal combustion engine is equal to or less than a maximum value of the output shaft revolution speed within the region; and the control unit determines that an abnormality of the internal combustion engine has occurred when the atmospheric pressure has the second value and the output shaft revolution speed of the internal combustion engine is greater than the maximum value.

5. The vehicle according to claim 1, wherein
the operation state is represented by the load of the internal combustion engine;
the control unit determines that an abnormality of the internal combustion engine has occurred when the atmospheric pressure has the first value and the load of the internal combustion engine is equal to or greater than a minimum value of the load within the region; and
the control unit determines that an abnormality of the internal combustion engine has occurred when the atmospheric pressure has the second value and the load of the internal combustion engine is less than the minimum value.

6. The vehicle according to claim 1, wherein
the operation state is represented by the output shaft revolution speed and the load of the internal combustion engine;
the control unit determines that an abnormality of the internal combustion engine has occurred when the atmospheric pressure has the first value, the output shaft revolution speed of the internal combustion engine is equal to or less than a maximum value of the output shaft revolution speed within the region, and the load of the internal combustion engine is equal to or greater than a minimum value of the load within the region; and
the control unit determines that an abnormality of the internal combustion engine has occurred when the atmospheric pressure has the second value, the output shaft revolution speed of the internal combustion engine is greater than the maximum value, and the load of the internal combustion engine is less than the minimum value.

7. An abnormality determination method for an internal combustion engine provided with a plurality of cylinders, comprising:
determining that an abnormality of the internal combustion engine has occurred when an atmospheric pressure has a first value and an operation state represented by at least one of an output shaft revolution speed and a load of the internal combustion engine is within a preset region; and
determining that an abnormality of the internal combustion engine has occurred when the atmospheric pressure has a second value that is lower than the first value and the operation state is outside the region.

8. An abnormality determination device for an internal combustion engine provided with a plurality of cylinders, comprising:
a first determination unit for determining that an abnormality of the internal combustion engine has occurred when an atmospheric pressure has a first value and an operation state represented by at least one of an output shaft revolution speed and a load of the internal combustion engine is within a preset region; and
a second determination unit for determining that an abnormality of the internal combustion engine has occurred when the atmospheric pressure has a second value that is lower than the first value and the operation state is outside the region.

9. The abnormality determination device according to claim 8, wherein
an abnormality of the internal combustion engine is not determined to have occurred when the atmospheric pressure has the first value and the operation state is outside the region.

10. The abnormality determination device according to claim 8, wherein
the first determination unit detects an abnormality of the internal combustion engine when the atmospheric pressure has the first value, the operation state is within the region, and an air-fuel ratio differs between the cylinders; and
the second determination unit detects an abnormality of the internal combustion engine when the atmospheric pressure has the second value, the operation state is outside the region, and the air-fuel ratio differs between the cylinders.

11. The abnormality determination device according to claim 8, wherein
the operation state is represented by the output shaft revolution speed of the internal combustion engine;
the first determination unit determines that an abnormality of the internal combustion engine has occurred when the atmospheric pressure has the first value and the output shaft revolution speed of the internal combustion engine is equal to or less than a maximum value of the output shaft revolution speed within the region; and
the second determination unit determines that an abnormality of the internal combustion engine has occurred when the atmospheric pressure has the second value and the output shaft revolution speed of the internal combustion engine is greater than the maximum value.

12. The abnormality determination device according to claim 8, wherein
the operation state is represented by the load of the internal combustion engine;
the first determination unit determines that an abnormality of the internal combustion engine has occurred when the atmospheric pressure has the first value and the load of the internal combustion engine is equal to or greater than a minimum value of the load within the region; and
the second determination unit determines that an abnormality of the internal combustion engine has occurred when the atmospheric pressure has the second value and the load of the internal combustion engine is less than the minimum value.

13. The abnormality determination device according to claim 8, wherein
the operation state is represented by the output shaft revolution speed and the load of the internal combustion engine;
the first determination unit determines that an abnormality of the internal combustion engine has occurred when the atmospheric pressure has the first value, the output shaft revolution speed of the internal combustion engine is equal to or less than a maximum value of the output shaft revolution speed within the region, and the load of the internal combustion engine is equal to or greater than a minimum value of the load within the region; and
the second determination unit determines that an abnormality of the internal combustion engine has occurred when the atmospheric pressure has the second value, the output shaft revolution speed of the internal combustion engine is greater than the maximum value, and the load of the internal combustion engine is less than the minimum value.

* * * * *